United States Patent
Kim et al.

(10) Patent No.: US 10,701,730 B2
(45) Date of Patent: Jun. 30, 2020

(54) METHOD FOR TRANSMITTING DATA IN WIRELESS COMMUNICATION SYSTEM AND APPARATUS THEREFOR

(71) Applicant: LG ELECTRONICS INC., Seoul (KR)

(72) Inventors: Jinmin Kim, Seoul (KR); Kiseon Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/579,939

(22) PCT Filed: Jun. 7, 2016

(86) PCT No.: PCT/KR2016/005967
§ 371 (c)(1),
(2) Date: Dec. 6, 2017

(87) PCT Pub. No.: WO2016/195442
PCT Pub. Date: Dec. 8, 2016

(65) Prior Publication Data
US 2018/0227952 A1  Aug. 9, 2018

Related U.S. Application Data

(60) Provisional application No. 62/171,256, filed on Jun. 5, 2015, provisional application No. 62/173,363, filed on Jun. 10, 2015.

(51) Int. Cl.
*H04W 74/08* (2009.01)
*H04L 27/26* (2006.01)
(Continued)

(52) U.S. Cl.
CPC ..... *H04W 74/0808* (2013.01); *H04L 27/0006* (2013.01); *H04L 27/2602* (2013.01);
(Continued)

(58) Field of Classification Search
CPC .................................................. H04W 74/0808
(Continued)

(56) References Cited

U.S. PATENT DOCUMENTS

| | | | |
|---|---|---|---|
| 9,402,238 B1 * | 7/2016 | Sun | H04W 52/243 |
| 10,172,137 B1 * | 1/2019 | Hedayat | H04W 74/02 |

(Continued)

FOREIGN PATENT DOCUMENTS

| | | |
|---|---|---|
| WO | 2011060310 | 5/2011 |
| WO | 2014209919 | 12/2014 |
| WO | 2015081169 | 6/2015 |

OTHER PUBLICATIONS

European Patent Office Application Serial No. 16803795.0, Search Report dated Nov. 14, 2018, 9 pages.
(Continued)

*Primary Examiner* — Peter G Solinsky
(74) *Attorney, Agent, or Firm* — Lee, Hong, Degerman, Kang & Waimey

(57) ABSTRACT

Disclosed herein is a spatial reuse (SR) method of a first station (STA) associated with a first basic service set (BSS) in a wireless LAN (WLAN) system may include receiving an inter-BSS physical protocol data unit (PPDU) from an AP or second STA associated with a second BSS different from the first BSS, wherein the inter-BSS PPDU includes a physical (PHY) preamble and an inter-BSS frame and the high efficiency (HE)-signal (SIG) A field of the PHY preamble includes an SR indicator indicating whether SR is allowed; performing CCA on a channel based on a clear channel assessment (CCA) level, that is, a criterion by which the busy or idle state of the channel is determined if the SR indicator indicates that the SR is allowed; and transmitting a signal through the idle channel when the channel is idle as a result of the execution of the CCA.

12 Claims, 7 Drawing Sheets

(51) Int. Cl.
  *H04L 27/00*   (2006.01)
  *H04W 84/12*   (2009.01)
  *H04W 74/00*   (2009.01)
  *H04L 5/00*    (2006.01)
  *H04W 16/14*   (2009.01)

(52) U.S. Cl.
  CPC ......... *H04W 74/0816* (2013.01); *H04L 5/001* (2013.01); *H04L 5/0023* (2013.01); *H04L 5/0048* (2013.01); *H04L 5/0053* (2013.01); *H04L 5/0091* (2013.01); *H04W 16/14* (2013.01); *H04W 74/002* (2013.01); *H04W 84/12* (2013.01)

(58) Field of Classification Search
  USPC .......................................................... 370/329
  See application file for complete search history.

(56) References Cited

U.S. PATENT DOCUMENTS

| | | | |
|---|---|---|---|
| 10,182,361 B1* | 1/2019 | Moon | H04L 27/2601 |
| 2008/0008133 A1 | 1/2008 | Zhu et al. | |
| 2012/0099582 A1 | 4/2012 | Cordeiro et al. | |
| 2014/0328268 A1* | 11/2014 | Zhu | H04W 74/002 370/329 |
| 2015/0078299 A1 | 3/2015 | Barriac et al. | |
| 2015/0124750 A1* | 5/2015 | Vermani | H04W 84/12 370/329 |
| 2016/0127909 A1* | 5/2016 | Huang | H04L 5/0062 370/329 |
| 2016/0233940 A1* | 8/2016 | Huang | H04W 4/70 |
| 2018/0279365 A1* | 9/2018 | Wang | H04W 16/14 |
| 2018/0332618 A1* | 11/2018 | Kakishima | H04B 7/0626 |
| 2019/0110297 A1* | 4/2019 | Hedayat | H04W 74/02 |
| 2019/0246415 A1* | 8/2019 | Zhang | H04W 72/1273 |

OTHER PUBLICATIONS

Son, J. et al., "Furhter Considerations on Enhanced CCA for 11ax", doc.: IEEE 802.11-14/0847r1, XP068069563, Jul. 2014, 12 pages.
PCT International Application No. PCT/KR2016/005967, International Search Report dated Oct. 4, 2016, 10 pages.

* cited by examiner

FIG. 5

| L-STF | L-LTF | L-SIG | HE-SIG A | | | | |
|---|---|---|---|---|---|---|---|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |

FIG. 6

| L-STF | L-LTF | L-SIG | HE-SIG A | | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

FIG. 7

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

METHOD FOR TRANSMITTING DATA IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/005967, filed on Jun. 7, 2016, which claims the benefit of U.S. Provisional Application No. 62/171,256, filed on Jun. 5, 2015 and 62/173,363, filed on Jun. 10, 2015, the contents of which are all hereby incorporated by reference herein in their entirety.

TECHNICAL FIELD

The present invention relates to a wireless communication system and, more particularly, to a method for performing the reuse of a space and a station (STA) device performing the method.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

In the case of an existing system, CCA is performed in a CCA level identically set for each BSS. That is, in a conventional technology, a fixed CCA level is applied to each BSS. Accordingly, in a conventional technology, there is a problem in that reuse efficiency of a spatial bandwidth between BSSs is very low. The reason for this is that STAs belonging to different BSSs determine that a channel is occupied and cannot transmit a signal because a fixed CCA level is applied to the BSS although each BSS can transmit a signal according to a communication environment and/or channel quality.

Accordingly, in a next-generation system, a spatial reuse execution technology in which a newly defined static/semi-static/dynamic CCA level is applied so that spatial reuse efficiency of a bandwidth can be enhanced is applied may be introduced. This specification proposes a method for performing such spatial reuse and an STA device for performing the method.

Technical objects to be achieved by the present invention are not limited to the aforementioned object, and those skilled in the art to which the present invention pertains may evidently understand other technical objects from the following description.

Technical Solution

In an embodiment of the present invention, a spatial reuse (SR) method of a first station (STA) associated with a first basic service set (BSS) in a wireless LAN (WLAN) system may include receiving an inter-BSS physical protocol data unit (PPDU) from an AP or second STA associated with a second BSS different from the first BSS, wherein the inter-BSS PPDU includes a physical (PHY) preamble, wherein an inter-BSS frame and the high efficiency (HE)-signal (SIG) A field of the PHY preamble includes an SR indicator indicating whether SR is allowed; performing a clear channel assessment (CCA) on a channel based on a CCA level, that is, a criterion by which the busy or idle state of the channel is determined when the SR indicator indicates that the SR is allowed; and transmitting a signal through the idle channel when the channel is idle as a result of the execution of the CCA.

Furthermore, the HE-SIG A field may further include an/a uplink (UL)/downlink (DL) indicator indicating whether the inter-BSS PPDU is a DL PPDU transmitted by the AP or an UL PPDU transmitted by the second STA.

Furthermore, a first CCA level applied when the PPDU is an UL PPDU and a second CCA level applied when the PPDU is a DL PPDU may be different.

Furthermore, the first CCA level may be greater than the second CCA level.

Furthermore, the first and the second CCA levels are set as predetermined fixed values.

The SR method may further include receiving information about the first and the second CCA levels and determining the first and the second CCA levels based on the received information. Performing the CCA may include performing the CCA on the channel based on the determined first CCA level when the PPDU is the UL PPDU and based on the determined second CCA level when the PPDU is the DL PPDU.

Furthermore, the information about the first and the second CCA levels may indicate the first and the second CCA levels, or the first or the second CCA level and information about a level difference between the first or the second CCA levels.

Furthermore, the information about the first and the second CCA levels may be received through a beacon frame, the HE-SIG A field or an HE-SIG B field.

Furthermore, according to another embodiment of the present invention, a first station (STA) associated with a first basic service set (BSS) in a wireless LAN (WLAN) system may include a radio frequency (RF) unit configured to transmit and receive a radio signal and a processor configured to control the RF unit. The first STA may receive an inter-BSS physical protocol data unit (PPDU) from an AP or second STA associated with a second BSS different from the first BSS, wherein the inter-BSS PPDU includes a physical (PHY) preamble and an inter-BSS frame and wherein the high efficiency (HE)-signal (SIG) A field of the PHY preamble includes an SR indicator indicating whether SR may be allowed; may perform a clear channel assessment (CCA) on a channel based on CCA level, that is, a criterion by which the busy or idle state of the channel is determined, when the SR indicator indicates that the SR is allowed; and may transmit a signal through the idle channel when the channel is idle as a result of the execution of the CCA.

Furthermore, the HE-SIG A field may further include an/a uplink (UL)/downlink (DL) indicator indicating whether the inter-BSS PPDU is a DL PPDU transmitted by the AP or an UL PPDU transmitted by the second STA.

Furthermore, a first CCA level applied when the PPDU is an UL PPDU and a second CCA level applied when the PPDU is a DL PPDU may be different.

Furthermore, the first CCA level may be greater than the second CCA level.

Furthermore, the first and the second CCA levels may be set as predetermined fixed values.

Furthermore, the first STA may receive information about the first and the second CCA levels, may determine the first and the second CCA levels based on the received information, and may perform the CCA on the channel based on the determined first CCA level when the PPDU is the UL PPDU and based on the determined second CCA level when the PPDU is the DL PPDU.

Furthermore, the information about the first and the second CCA levels may indicate the first and the second CCA levels, or the first or the second CCA level and information about a level difference between the first and the second CCA levels.

Furthermore, the information about the first and the second CCA levels may be received through a beacon frame, the HE-SIG A field or an HE-SIG B field.

Advantageous Effects

In accordance with an embodiment of the present invention, since a CCA level is properly set according to circumstances, a loss of communication performance can be minimized by handling a change in the state of STAs and a change in the channel environment between STAs actively and rapidly.

Furthermore, in accordance with an embodiment of the present invention, reuse efficiency of a spatial bandwidth between STAs belonging to an OBSS can be maximized by properly setting a CCA level when an UL inter-BSS frame is received to be higher than a CCA level when a DL inter-BSS frame is received by taking into consideration such a channel situation and BSS characteristics.

More specifically, if a victim STA is an AP of an OBSS, a BSS to which an SR STA belongs and a BSS to which an OBSS AP belongs have an inter-BSS relation. Accordingly, it may be assumed that the SR STA and the OBSS AP have been spaced apart from each other at a specific distance or more. If a victim STA is an OBSS STA, however, it may not be assumed that the SR STA and the OBSS STA are spaced apart from each other at a specific distance or more.

Accordingly, this specification can maximize reuse efficiency of a spatial bandwidth by setting a CCA level if a received inter-BSS frame is an UL frame to be greater than a CCA level applied if the received inter-BSS frame is a DL frame.

Other advantageous effects of the present invention are additionally described in the following embodiments.

DESCRIPTION OF DRAWINGS

The accompany drawings, which are included to provide a further understanding of this document and are incorporated on and constitute a part of this specification illustrate embodiments of this document and together with the description serve to explain the principles of this document.

FIG. 5 is a diagram illustrating an HE format PPDU according to an embodiment of the present invention.

FIG. 6 is a diagram illustrating an HE format PPDU according to an embodiment of the present invention.

FIG. 7 is a diagram illustrating an HE format PPDU according to an embodiment of the present invention.

BEST MODE FOR INVENTION

Figure 1:
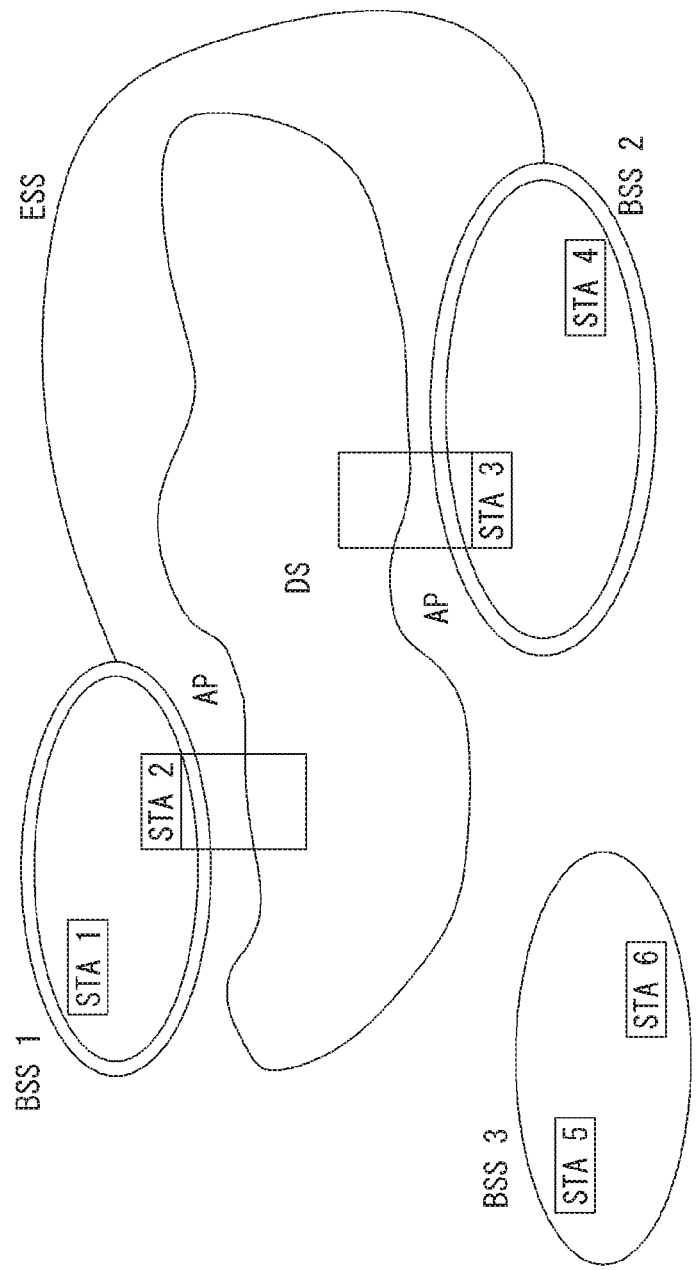
FIG. 1 is a diagram showing an example of an IEEE 802.11 system to which an embodiment of the present invention may be applied.

Terms used in the present invention are common terms now widely used by taking into consideration functions in the present invention, but the terms may be changed depending on intentions or use practices of those skilled in the art or the appearance of a new technology. Furthermore, in a specific case, some terms are randomly selected by the applicant. In this case, the detailed meaning of a corresponding term will be described in the corresponding part of the description of the present invention. Accordingly, the terms used in the present invention should not be understood simply based on their names, but should be understood based on their substantial meanings and contents over this specification.

Furthermore, embodiments of the present invention are described in detail below with reference to the accompanying drawings and contents described in the drawings, but the present invention is not limited or restricted by the embodiments.

Some embodiments of the present invention are described in detail below with reference to the accompanying drawings.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station MS, a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

Figure 2:
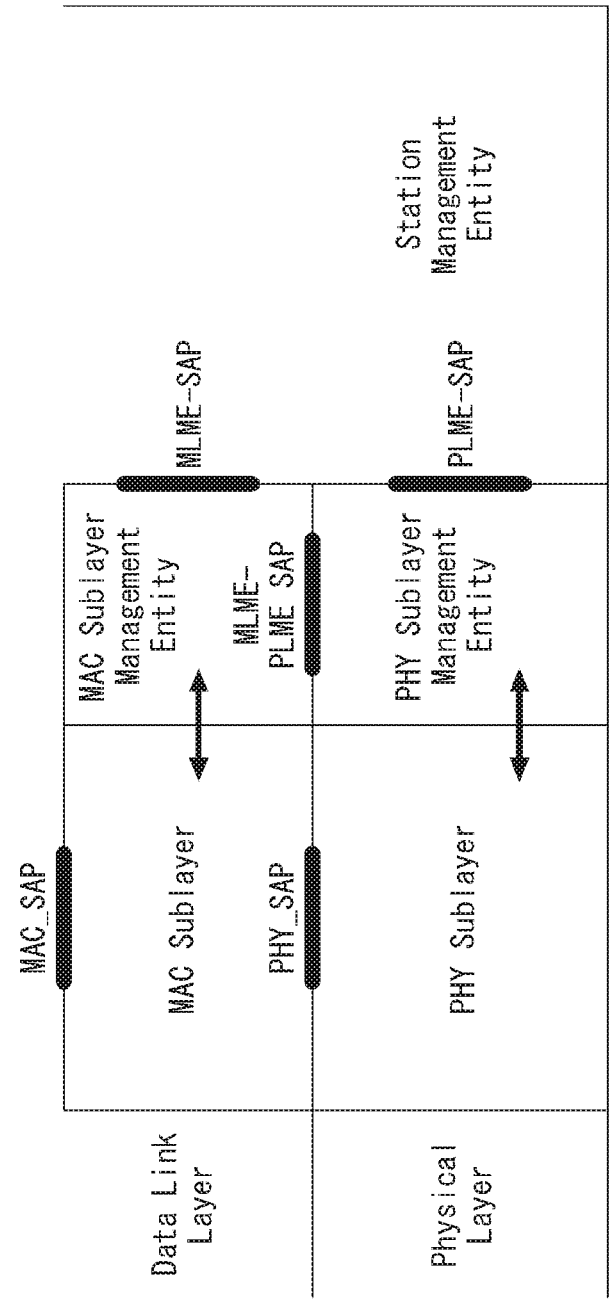
FIG. 2 is a diagram illustrating the structure of layer architecture of the IEEE 802.11 system to which an embodiment of the present invention may be applied.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

Figure 3:
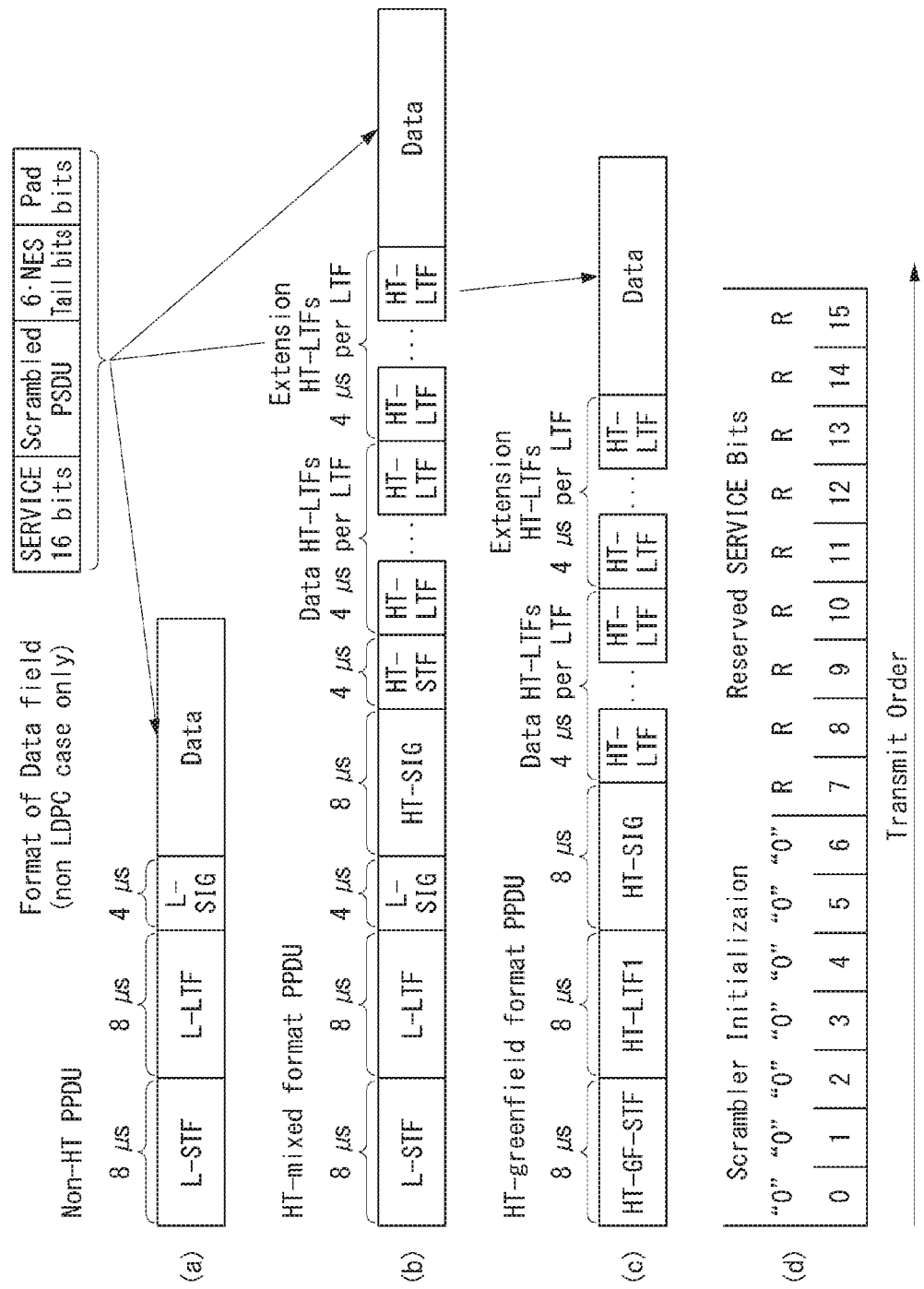
FIG. 3 illustrates a non-HT format PPDU and HT format PPDU of a wireless communication system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the format of a non-HT PPDU is composed of a legacy format preamble, including a legacy (or non-HT) short training field (L-STF), a legacy (or non-HT) long training field (L-LTF), and a legacy (or non-HT) SIGNAL (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field includes a rate field of 4 bits, a reserved field of 1 bit, a length field of 12 bits, a parity field of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, and L-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

TABLE 1

| Field | Bit | Description |
|---|---|---|
| MCS | 7 | Indicate a modulation and coding scheme |
| CBW 20/40 | 1 | Set to "0" if a CBW is 20 MHz or 40 MHz or upper/lower Set to "1" if a CBW is 40 MHz |
| HT length | 16 | Indicate the number of data octets within a PSDU |
| Smoothing | 1 | Set to "1" if channel smoothing is recommended Set to "0" if channel estimation is recommended unsmoothingly for each carrier |

TABLE 1-continued

| Field | Bit | Description |
|---|---|---|
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

Figure 4:
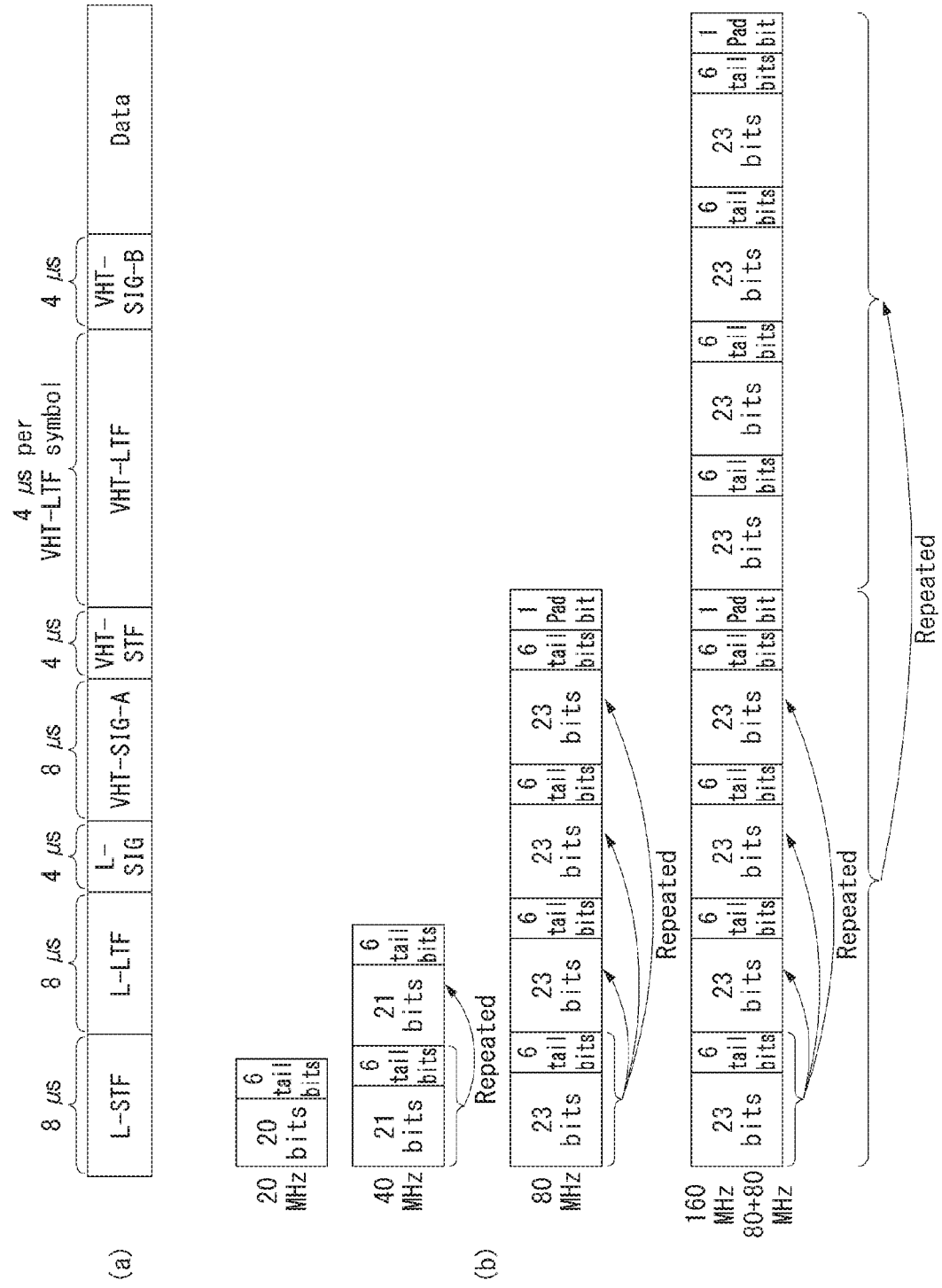
FIG. 4 illustrates a VHT format PPDU format of a wireless communication system to which an embodiment of the present invention may be applied.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 illustrates the VHT-SIG-A1 field.

TABLE 2

| Field | Bit | Description |
| --- | --- | --- |
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |
| TXOP_PS_NOT_ALLOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| Field | Bit | Description |
| --- | --- | --- |
| Short GI | 1 | Set to "0" if a short GI is not used in a data field<br>Set to "1" if a short GI is used in a data field |

TABLE 3-continued

| Field | Bit | Description |
| --- | --- | --- |
| Short GI disambiguation | 1 | Set to "1" if a short GI is used and an extra symbol is required for the payload of a PPDU<br>Set to "0" if an extra symbol is not required |
| SU/MU coding | 1 | In the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder<br>Set to "0" |

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail later with reference to figures.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise. Furthermore, the HE format PPDU may include a physical (PHY) preamble and a data field (or data frame). The PHY preamble may include an HE-SIG A field, an HE-SIG B field, an HE-STF and/or an HE-LTF in addition to the aforementioned L-STF, L-LTF, and L-SIG field. Such HE format fields are described in detail later with reference to corresponding figures.

FIG. 5 is a diagram illustrating an HE format PPDU according to an embodiment of the present invention.

FIG. 5 illustrates a PPDU format if 80 MHz has been allocated to a single STA (or if an OFDMA resource unit has been allocated to a plurality of STAs within 80 MHz) or if different streams of 80 MHz have been allocated to a plurality of STAs, respectively.

Referring to FIG. 5, an L-STF, an L-LTF, and an L-SIG field may be transmitted in an OFDM symbol generated based on 64 FFT points (or 64 subcarriers) in each 20 MHz channel.

Furthermore, an HE-SIG B field may be located after an HE-SIG A field. In this case, an FFT size per unit frequency may be further increased after the HE-STF (or the HE-SIG B field). For example, from the HE-STF (or the HE-SIG B field), 256 FFT may be used in a 20 MHz channel, 512 FFT may be used in a 40 MHz channel, and 1024 FFT may be used in a 80 MHz channel.

The HE-SIG A field may include common control information (common field), transmitted to STAs which receive a PPDU, in common. The HE-SIG A field may be transmitted in 1 to 3 OFDM symbols. The HE-SIG A field is duplicated in a 20 MHz unit and includes the same information. Furthermore, the HE-SIG A field provides notification of information about the entire bandwidth of a system.

Table 4 illustrates information included in the HE-SIG A field.

TABLE 4

| Field | Bit | Description |
| --- | --- | --- |
| Bandwidth | 2 | Indicate a bandwidth in which a PPDU is transmitted. For example, 20 MHz, 40 MHz, 80 MHz or 160 MHz |
| Group_ID | 6 | Indicate an STA or a group of STAs which will receive a PPDU |
| Stream information | 12 | Indicate the location or number of a spatial stream for each STA or indicate the location or number of a spatial stream for a group of STAs |
| UL indication | 1 | Indicate whether a PPDU is directed toward an AP (uplink) or is directed toward an STA (downlink) |
| MU indication | 1 | Indicate whether a PPDU is an SU-MIMO PPDU or an MU-MIMO PPDU |
| GI indication | 1 | Indicate whether a short GI is used or a long GI is used |
| Allocation information | 12 | Indicate a band or channel (a subchannel index or a subband index) allocated to each STA in a band in which a PPDU is transmitted |
| Transmission (Tx) power | 12 | Indicate transmission power for each channel or each STA |

The information included in each of the fields illustrated in Table 4 may comply with the definition of an IEEE 802.11 system. Furthermore, the above-described fields correspond to an example of fields which may be included in a PPDU, but are not limited thereto. That is, the fields may be replaced with other fields and may further include an additional field. All of the fields may not be essentially included. Another embodiment of information included in the HE-SIG A field is described later with reference to FIG. 6.

The HE-STF is used to improve performance of AGC estimation in MIMO transmission.

The HE-SIG B field may include user-specific information that is necessary for each STA to its own data (e.g., a PSDU). The HE-SIG B field may be transmitted in one or two OFDM symbols. For example, the HE-SIG B field may include information about the modulation and coding scheme (MCS) of a corresponding PSDU and the length of the corresponding PSDU.

The L-STF, the L-LTF, the L-SIG field, and the HE-SIG A field may be repeated and transmitted in a 20 MHz channel. For example, when a PPDU is transmitted through four 20 MHz channels (i.e., an 80 MHz band), the L-STF, the L-LTF, the L-SIG field, and the HE-SIG A field may be repeated and transmitted every 20 MHz channel.

If an FFT size increases, a legacy STA supporting the existing IEEE 802.11a/g/n/ac may not decode a corresponding HE PPDU. For the coexistence of a legacy STA and an HE STA, the L-STF, the L-LTF, and the L-SIG field are transmitted through a 64 FFT in a 20 MHz channel so that the legacy STA can receive them. For example, the L-SIG field may occupy a single OFDM symbol, a single OFDM symbol time may be 4 μs, and a GI may be 0.8 μs.

An FFT size for each frequency unit may be further increased from the HE-STF (or the HE-SIG A field). For example, 256 FFT may be used in a 20 MHz channel, 512 FFT may be used in a 40 MHz channel, and 1024 FFT may be used in a 80 MHz channel. If an FFT size increases, the number of OFDM subcarriers per a unit frequency is increased because an interval between the OFDM subcarriers is reduced, but the OFDM symbol time is increased. In order to improve efficiency of a system, the length of a GI after the HE-STF may be set to be the same as that of the GI of the HE-SIG A field.

The HE-SIG A field may include information that is necessary for an HE STA to decode an HE PPDU. However, the HE-SIG A field may be transmitted through 64 FFT in a 20 MHz channel so that both a legacy STA and an HE STA can receive the HE-SIG A field. The reason for this is that the HE STA can receive the existing HT/VHT format PPDU in addition to an HE format PPDU and the legacy STA and the HE STA have to distinguish the HT/VHT format PPDUs and the HE format PPDU from each other.

FIG. 6 is a diagram illustrating an HE format PPDU according to an embodiment of the present invention.

In FIG. 6, it is assumed that 20 MHz channels are respectively allocated to different STAs (e.g., an STA 1, an STA 2, an STA 3, and an STA 4).

Referring to FIG. 6, an FFT size per unit frequency may be further increased from an HE-STF (or an HE-SIG B field). For example, from the HE-STF (or the HE-SIG B field), 256 FFT may be used in a 20 MHz channel, 512 FFT may be used in a 40 MHz channel, and 1024 FFT may be used in a 80 MHz channel.

Information transmitted in each field included in a PPDU is the same as that of the example of FIG. 26, and thus a description thereof is omitted.

The HE-SIG B field may include information specific to each STA, but may be encoded in the full band (i.e., indicated in an HE-SIG A field). That is, the HE-SIG B field includes information about all of STAs, and all of the STAs receive the HE-SIG B field.

The HE-SIG B field may provide notification of information about a frequency bandwidth allocated to each STA and/or information about a stream in a corresponding frequency band. For example, in FIG. 27, in the HE-SIG B field, 20 MHz may be allocated to the STA 1, next 20 MHz may be allocated to the STA 2, next 20 MHz may be allocated to the STA 3, and next 20 MHz may be allocated to the STA 4. Furthermore, 40 MHz may be allocated to the STA 1 and the STA 2, and next 40 MHz may be allocated to the STA 3 and the STA 4. In this case, different streams may be allocated to the STA 1 and the STA 2, and different streams may be allocated to the STA 3 and the STA 4.

Furthermore, an HE-SIG-C field may be defined and added to the example of FIG. 6. In this case, in the HE-SIG B field, information about all of STAs may be transmitted over the full band, and control information specific to each STA may be transmitted through the HE-SIG-C field in a 20 MHz unit.

Furthermore, unlike in the examples of FIGS. 5 and 6, the HE-SIG B field is not transmitted over the full band, but may be transmitted in a 20 MHz unit like the HE-SIG A field. This is described with reference to FIG. 24.

FIG. 7 is a diagram illustrating an HE format PPDU according to an embodiment of the present invention.

In FIG. 7, it is assumed that 20 MHz channels are respectively allocated to different STAs (e.g., an STA 1, an STA 2, an STA 3, and an STA 4).

Referring to FIG. 7, an HE-SIG B field is not transmitted over a full band, but is transmitted in a 20 MHz unit like an HE-SIG A field. In this case, however, the HE-SIG B field is encoded and transmitted in a 20 MHz unit unlike in the HE-SIG A field, but may not be duplicated in a 20 MHz unit and transmitted.

In this case, an FFT size per unit frequency may be further increased from an HE-STF (or the HE-SIG B field). For example, from the HE-STF (or the HE-SIG B field), 256 FFT may be used in a 20 MHz channel, 512 FFT may be used in a 40 MHz channel, and 1024 FFT may be used in a 80 MHz channel.

Information transmitted in each field included in a PPDU is the same as that of the example of FIG. 26, and thus a description thereof is omitted.

The HE-SIG A field is duplicated in a 20 MHz unit and transmitted.

The HE-SIG B field may provide notification of information about a frequency bandwidth allocated to each STA and/or information about a stream in a corresponding frequency band. The HE-SIG B field may include information about each STA for each the HE-SIG B field of a 20 MHz unit because it includes information about each STA. In this case, the example of FIG. 23 illustrates a case where 20 MHz is allocated to each STA. For example, if 40 MHz is allocated to an STA, the HE-SIG B field may be duplicated in a 20 MHz unit and transmitted.

In a situation in which a different bandwidth is supported for each BSS, if some bandwidths having a small interference level from a neighbor BSS is allocated to an STA, the HE-SIG B field may not be transmitted over a full band as described above.

For example, the HE format PPDU of FIG. 23 is described as a basis, for convenience of description.

In FIGS. 5 to 7, a data field is payload and may include a service field, a scrambled PSDU, tail bits, and padding bits.

An HE format PPDU, such as that of FIGS. 5 to 7, may be determined through a repeated L-SIG (RL-SIG) field, that is, the repeated symbol of an L-SIG field. The RL-SIG field is inserted in front of the HE SIG-A field, and each STA may determine the format of a received PPDU to be an HE format PPDU using the RL-SIG field.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Method for Performing CCA

A clear channel assessment (CCA) method of an HE STA is described in more detail below. As described above, an AP STA and a non-AP STA perform CCA in order to determine the busy or idle state of a channel. CCA indicates a logical function/operation in the physical layer in which the current use state of a wireless medium (WM) is determined.

An STA performs CCA in the physical layer and reports a result of the execution of CCA to the MAC layer. The STA may perform CCA in two modes, that is, CCA-energy detection (ED) and CCA-carrier sensing (CS). In an embodiment, the STA may determine the busy or idle state of a channel by performing CCA-ED, performing CCA-CS, or using a combination of CCA-CS and CCA-ED. If CCA-CS and CCA-ED are combined, the STA may perform CCA by first performing CCA-CS and then performing CCA-ED or may perform CCA by first performing CCA-ED and then performing CCA-CS.

CCA-CS is performed through signal detection for a preamble. The threshold of CCA-CS is determined based on a minimum modulation and code rate sensitivity. Furthermore, a level of CCA-CS, that is, a threshold value, may be set as a different value depending on a bandwidth. For example, in the case of 20 MHz channel spacing, an STA may determine a channel to be busy if the size of a received/obtained preamble signal (or CCA value) is −82 dBm or more. In the case of 10 MHz channel spacing, an STA may determine a channel to be busy if the size of a received/obtained preamble signal (or CCA value) is −85 dBm or more. In the case of 5 MHz channel spacing, an STA may determine a channel to be busy if the size of a received/obtained preamble signal (or CCA value) is −88 dBm or more. On the contrary, an STA may determine the channel to be idle if the size of the received/obtained preamble signal (or CCA value) is less than threshold (dBm)(e.g. −82 dBm, −85 dBm −88 dBm). In an embodiment, an STA may perform CCA-CS using the correlation of STFs in the preamble of an 802.11a signal. In this specification, a CCA threshold/threshold value of an dBm unit may be called a CCA level. In this specification, CCA-CS may also be called CCA-signal detection (SD).

In the case of CCA-ED, an STA may determine a channel to be busy if a specific signal is detected with intensity (dBm) of a threshold value or more regardless of a signal defined in the 802.11 system. In this case, the threshold may be calculated as a value that is 20 dBm higher than that of CCA-CS. For example, an STA may determine a channel to be busy if a threshold is −62 dBm or more in the case of 20 MHz channel spacing. An STA may determine a channel to be busy if a threshold is −65 dBm or more in the case of 10 MHz channel spacing. An STA may determine a channel to be busy if a threshold is −68 dBm or more in the case of 5 MHz channel spacing.

A method described hereinafter may be applied to both CCA-CS and CCA-ED, but in the following embodiments, an example in which an STA performs CCA-CS is described.

If an STA and a system support a broadband, such as 20/40/80/160 MHz, a different CCA level may be applied to a primary channel and a non-primary channel (or a secondary channel). In this case, CCA levels (or threshold values) according to respective channel bandwidths may be defined as in Table 5.

TABLE 5

| Channel bandwidth | Signal threshold (primary) | Signal threshold (non-primary) | Energy threshold (non-primary) |
| --- | --- | --- | --- |
| 20 Hz | −82 dBm | −72 dBm | −62 dBm |
| 40 MHz | −79 dBm | −72 dBm | −59 dBm |
| 80 MHz | −76 dBm | −69 dBm | −86 dBm |
| 160 MHz | −73 dBm | n/a | n/a |

In Table 5, in the case of a 160 MHz channel, a corresponding signal threshold/energy threshold is not defined because a secondary channel is not present.

Figure 8:
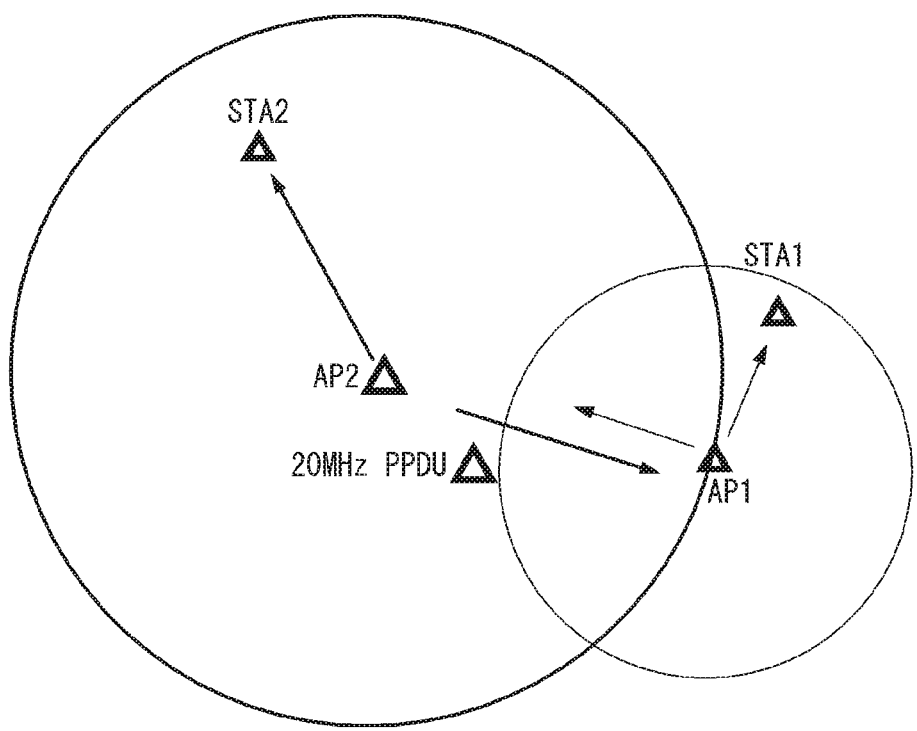
FIG. 8 is a conceptual diagram showing a CCA execution method according to an embodiment of the present invention.

FIG. 8 is a conceptual diagram showing a method for performing CCA according to an embodiment of the present invention.

As described above, an efficient resource operation on the space may be difficult because a CCA level, that is, a CCA threshold, is managed as a fixed value within a single BSS for each channel bandwidth. In FIG. 8 and the following embodiments, an AP 1 and an STA 1 may belong to a first BSS, and an AP 2 and an STA 2 may belong to a second BSS.

Referring to FIG. 8, the AP 2 may send a PPDU to the STA 2 through a 20 MHz channel. In this case, when a signal transmitted by the AP 2 is received by the AP 1 with signal intensity of −82 dBm or more, the AP 1 determines the channel to be busy and does not send a signal to the STA 1. However, in an environment in which the AP 1 and the STA 1 are sufficiently distant from the AP 2 or the STA 2 or interference from the signal transmitted by the AP 1 does not have a great influence on the STA 2, it is more efficient that the AP 1 sends the signal to the STA 1. That is, if a fixed CCA level is used, resource use efficiency on the space is deteriorated. More specifically, this may be problematic if a first BSS to which the AP 1 and the STA 1 belong (or associated) and a second BSS to which the AP 2 and the STA 2 belong (or associated) are an overlapping basic service set (OBSS) as shown in FIG. 8. In this case, BSSs in which some or all of BSA overlap and which operate on the same channel are called the OBSS. Furthermore, an AP/STA located (or belonging) in such as OBSS is called an OBSS AP/STA.

Accordingly, an STA may perform spatial reuse (SR) (the improvement of efficiency on space) in which spatial resources are efficiently used by adjusting/setting a proper CCA level according to circumstances, determining the burs/idle state of a channel based on the adjusted CCA level, and transmitting a signal. That is, the STA does not use a flat CCA level. Instead, if its own signal is determined to not have a great influence on another STA when executing SR, the STA adjusts a CCA level to be low (or reducing a criterion by which the idle state of a channel is determined), thereby enabling transmission resources to be used more efficiently.

In this case, in order for the STA to properly determine/control/configure a CCA level according to circumstances, a criterion by which a CCA level is calculated and adjusted and a rule by which a CCA level is managed should have been previously defined. Accordingly, this specification proposes an efficient method for setting such a CCA level of an STA.

Hereinafter, an STA or AP which has determined that a channel was occupied (i.e., busy) through CCA-CS in an existing system and thus has not transmitted data/frame/signal as in the AP 1 and STA 1 of FIG. 8 or an STA or AP to which the opportunity to transmit (or perform SR) data/frame/signal is assigned through a dynamic CCA method proposed by this specification is called an "SR STA (or SR device)", for convenience of a description.

Method for Configuring CCA Level

In this specification, in order to perform SR, first, an SR STA may determine when a received frame is an intra-BSS frame or an inter-BSS frame (or an OBSS frame). In this case, the intra-BSS frame refers to a frame transmitted by a BSS to which an SR STA belongs (or a frame transmitted by an AP/STA belonging to a corresponding BSS). The inter-BSS frame refers to a frame transmitted by an OBSS for an SR STA (or a frame transmitted by an AP/STA belonging to an OBSS). In order to determine whether the received frame is an inter-BSS frame or an intra-BSS frame, the SR STA may use a BSS color (i.e., an identifier used to identify a BSS) included in the HE-SIG A field (or the HE-SIG A field included in a PPDU that carries the received frame) and/or the MAC address of a MAC header. For example, if the BSS color of a received HE-SIG A field is the same as its own BSS color, the SR STA may determine that the received frame is an intra-BSS frame. If the BSS color of a received HE-SIG A field is different from its own BSS color, the SR STA may determine that the received frame is an inter-BSS frame.

If, as a result of the determination, the received frame is an inter-BSS frame (or an OBSS frame), the SR STA may set a new CCA-CS-threshold value (of a minimum receive sensitivity level (or minimum CCA sensitivity level) or higher). In this specification, as described above, a CCA level that is newly set/applied with respect to an inter-BSS frame may be called a "CCA-CS-threshold" or "OBSS-CCA-CS-threshold/".

In this case, this specification proposes that an SR STA should apply a different CCA level depending on whether an inter-BSS frame (or an OBSS frame) is a DL frame or an UL frame. The reason for this is that an STA (i.e., a victim STA) influenced by interference when the SR STA executes SR may be different depending on whether the intra-BSS frame is a DL frame or an UL frame.

For example, if the inter-BSS frame is an UL frame, the victim STA becomes an AP of an OBSS (or another BSS). If the inter-BSS frame is a DL frame, the victim STA becomes an STA of an OBSS (or another BSS). In other words, if the inter-BSS frame is an UL frame, the victim STA becomes an AP belonging to the same BSS as an STA that has transmitted the corresponding inter-BSS frame. If the inter-BSS frame is a DL frame, the victim STA becomes an STA belonging to the same BSS as an AP that has transmitted the corresponding inter-BSS frame.

In this case, if the victim STA is an AP of the OBSS, it may be assumed that an SR STA and an OBSS AP have been spaced apart from each other at a specific distance or more because a BSS to which the SR STA belongs and a BSS to which the OBSS AP belongs have an inter-BSS relation. However, if the victim STA is an OBSS STA, an SR STA cannot obtain accurate information about the distance from the OBSS STA. That is, if the victim STA is an OBSS STA, it may not be assumed that the SR STA and the OBSS STA have been spaced apart from each other at a specific distance or more. Accordingly, if the SR STA is located close to the OBSS STA, an SR operation of the SR STA may cause a serious interference on the OBSS STA.

Accordingly, this specification proposes that an SR STA should apply/set a differential OBSS-CCA-CS-threshold depending on whether a received inter-BSS frame is an UL frame or a DL frame and perform SR. Hereinafter, an OBSS-CCA-CS-threshold applied if an inter-BSS frame is a DL frame is referred to as an "OBSS-DL-CCA-CS-threshold" and an OBSS-CCA-CS-threshold applied if an inter-BSS frame is an UL frame is referred to as an "OBSS-UL-CCA-CS-threshold", for convenience of a description.

In order to apply/set such a differential OBSS-CCA-CS-threshold, first, an SR STA needs to determine whether a received inter-BSS frame is a DL frame or an UL frame. Accordingly, to this end, this specification proposes that a 1-bit indicator (i.e., an UL/DL frame indicator) indicating whether a corresponding frame is a DL frame or an UL frame should be added to the HE-SIG A field indicative of control information about a corresponding inter-BSS frame.

For example, an UL/DL indication field (1 bit) may be added to the HE-SIG A field indicative of control/indication information about an inter-BSS frame. If a corresponding field value is '0', it may indicate that an inter-BSS frame is an UL frame. If a corresponding field value is '1', it may indicate that an inter-BSS frame is a DL frame. Alternatively, if a corresponding field value is '1', it may indicate that an inter-BSS frame is a DL frame. If a corresponding field value is '1', it may indicate that an inter BBS inter-BSS frame is an UL frame.

If an UL/DL frame indicator is transmitted through the HE-SIG A field, an AP/STA located/belonging to an inter-BSS in addition to an AP/STA located/belonging to an intra-BSS can also determine whether a received frame is an UL frame or a DL frame.

As described above, an SR STA that has determined whether an inter-BSS frame is an UL or DL frame through the HE-SIG A field may apply a different OBSS-CCA-CS-threshold depending on whether the inter-BSS frame is an UL frame or a DL frame. This may be basically implemented using the following three methods (1. Static method, 2. Semi-static method, and 3. Dynamic method).

1. Static Method

In an embodiment, an SR STA may apply a predetermined fixed value as an OBSS-DL-CCA-CS-threshold for a DL frame and an OBSS-UL-CCA-CS-threshold for an UL frame.

First, if the transmission/reception bandwidth of an inter-BSS frame is 20 MHz, an OBSS-DL-CCA-CS-threshold (−x dBm) may be set as a value greater than −82 dBm. An OBSS-UL-CCA-CS-threshold (−y dBm) may be set as a value greater than the −x dBm. For example, the OBSS-DL-CCA-CS-threshold (−x dBm) may be set to −72 dBm, that is, the middle of a CCA-ED value and a CCA-CA value. The OBSS-UL-CCA-CS-threshold (−y dBm) may be set to −67 dBm. Alternatively, the threshold values may be defined to have a difference of a predetermined value according to a specific equation. For example, OBSS-UL-CCA-CS-threshold=OBSS-DL-CCA-CS-threshold+z dB. In this case, z is an integer other than 0.

If the transmission/reception bandwidth (BW) of an inter-BSS frame exceeds 20 MHz, an SR STA may apply a value calculated by adding 10*log(BW/20 MHz) dB(a) to a threshold value defined in the 20 MHz bandwidth. For example, if the transmission/reception bandwidth of an inter-BSS frame is 40 MHz, a=10*log (40 MHz/20 MHz)=3 dB. Accordingly, in the aforementioned example (if −x dBm=−72 dBm and −y dBm=−67 dBm), the OBSS-DL-CCA-CS-threshold may be calculated as −69 dBm (=−72 dBm+3 dB) and the OBSS-UL-CCA-CS-threshold may be calculated −64 dBm (=−67 dBm+3 dB).

That is, in the present embodiment, the x, y, and z values may be determined to be system parameters previously defined based on the transmission/reception bandwidth of an inter-BSS frame.

2. Semi-Static Method (1) 2-1 Embodiment

In an embodiment, an SR STA may receive an OBSS-DL-CCA-CS-threshold for a DL frame and an OBSS-UL-CCA-CS-threshold for an UL frame from the outside and may perform SR using/based on the OBSS-DL-CCA-CS-threshold and the OBSS-UL-CCA-CS-threshold. That is, the SR STA may apply a fixed OBSS-CCA-CS-threshold value according to each transmission situation.

More specifically, an OBSS-DL-CCA-CS-threshold value and OBSS-UL-CCA-CS-threshold value generated based on a 20 MHz transmission bandwidth may be transmitted through a specific frame (e.g., beacon frame) of an intra-BSS. An SR STA that has received the OBSS-DL-CCA-CS-threshold value and the OBSS-UL-CCA-CS-threshold value may perform SR using the received SR indication information. In this case, the OBSS-DL-CCA-CS-threshold value and the OBSS-UL-CCA-CS-threshold value may be signaled and transmitted independently. For example, the OBSS-DL-CCA-CS-threshold value and the OBSS-UL-CCA-CS-threshold value may be signaled as in examples of Table 6 and Table 7 below. Table 6 and Table 7 are examples in which the OBSS-CCA-CS-threshold field of a total of 4 bits is configured by allocating 2 bits to information bits of each threshold.

TABLE 6

| Field name | Bits | Value |
|---|---|---|
| OBSS-DL-CCA-CS-threshold | 00 | −82 dBm |
| | 01 | −77 dBm |
| | 10 | −72 dBm |
| | 11 | −67 dBm |

TABLE 7

| Field name | Bits | Value |
|---|---|---|
| OBSS-UL-CCA-CS-threshold | 00 | −82 dBm |
| | 01 | −77 dBm |
| | 10 | −72 dBm |
| | 11 | −67 dBm |

In this case, for example, it may be assumed that an SR STA has received an OBSS-DL-CCA-CS-threshold field value of '00' and an OBSS-UL-CCA-CS-threshold field value of '01'. In this case, the SR STA may apply −82 dBm as the OBSS-CCA-CS-threshold value if a received inter-BSS frame is a DL frame, and may apply −77 dBm as the OBSS-CCA-CS-threshold value if the received inter-BSS frame is an UL frame.

Alternatively, unlike in the aforementioned embodiment, in order to reduce the number of information bits, the OBSS-DL-CCA-CS-threshold value and the OBSS-UL-CCA-CS-threshold value may be signaled and transmitted dependently. For example, one threshold value may be explicitly signaled, and the other threshold value may be signaled and transmitted as a value (i.e., a difference value) different from the threshold value. An example thereof is illustrated in Table 8 and Table 9.

TABLE 8

| Field name | Bits | Value |
|---|---|---|
| OBSS-DL-CCA-CS-threshold | 00 | −82 dBm |
| | 01 | −77 dBm |
| | 10 | −72 dBm |
| | 11 | −67 dBm |

TABLE 9

| Field name | Bits | Value |
|---|---|---|
| OBSS-UL-CCA-CS-threshold | 0 | OBSS-DL-CCA-CS-threshold + 5 dB |
| | 1 | OBSS-DL-CCA-CS-threshold + 10 dB |

If the OBSS-DL-CCA-CS-threshold value and the OBSS-UL-CCA-CS-threshold value are signaled as in Table 8 and Table 9, there is an advantage in that the number of information bits (3 bits) is smaller than the number of information bits (4 bits) required when the OBSS-DL-CCA-CS-threshold value and the OBSS-UL-CCA-CS-threshold value are signaled as in Table 6 and Table 7.

Alternatively, unlike in the aforementioned embodiment, in order to further reduce the number of additional information bits, an SR STA may operate the OBSS-DL-CCA-CS-threshold value as a fixed value as in the static method and may manage only the OBSS-UL-CCA-CS-threshold value in such a way as to receive it from the outside. In this case, the externally provided OBSS-UL-CCA-CS-threshold value may be provided as a relative difference value for the OBSS-DL-CCA-CS-threshold value. In this case, the OBSS-UL-CCA-CS-threshold value may be signaled as in Table 10 below, for example. In this case, in order to signal the OBSS-UL-CCA-CS-threshold value, a total of 1 bit is required as the number of information bits.

TABLE 10

| Field name | Bits | Value |
| --- | --- | --- |
| OBSS-UL-CCA-CS-threshold | 0 | 1 |
| | −x dBm + 5 dB | −x dBm + 10 dB |

Alternatively, unlike in the above example, an SR STA may operate the OBSS-UL-CCA-CS-threshold value as a fixed value as in the static method and may operate the OBSS-DL-CCA-CS-threshold value in such a way as to receive it from the outside.

The SR STA that has been aware of (or received/obtained) the OBSS-UL-CCA-CS-threshold value and the OBSS-DL-CCA-CS-threshold value through the aforementioned embodiment may compare each of threshold values with received power of an inter-BSS frame. If, as a result of the comparison, the received power of the inter-BSS frame is found to be smaller than the threshold value, the SR STA may determine that the transmission/reception channel of the inter-BSS frame is idle and may transmit (i.e., perform SR) a signal/data through the corresponding channel. In contrast, if, as a result of the comparison, the received power of the inter-BSS frame is found to be not smaller than the threshold value, the SR STA may determine the transmission/reception channel of the inter-BSS frame is busy and may not transmit (i.e., may not perform SR) a signal/data through the corresponding channel.

An example in which an OBSS-UL-CCA-CS-threshold value and OBSS-DL-CCA-CS-threshold value for a 20 MHz transmission bandwidth are transmitted has been described in the aforementioned embodiments.

However, the present invention is not limited thereto. In preparation for a case where the transmission bandwidth of an inter-BSS frame is different from the transmission bandwidth of a frame to be transmitted by an SR STA, an AP/STA may transmit an OBSS-DL-CCA-CS-threshold value and an OBSS-UL-CCA-CS-threshold value for a total transmission bandwidth (or full bandwidth) (or a total transmission bandwidth of a PPDU that carries an inter-BSS frame) of an inter-BSS frame to the SR STA by signaling the OBSS-DL-CCA-CS-threshold value and the OBSS-UL-CCA-CS-threshold value.

Alternatively, an SR STA may calculate a threshold value to be newly applied by taking into consideration the transmission bandwidth (or channel bandwidth) of a frame/PPDU to be transmitted by the SR STA based on an OBSS-DL-CCA-CS-threshold value and OBSS-UL-CCA-CS-threshold value set based on a 20 MHz transmission bandwidth as described above. For example, if the SR STA tries to transmit a frame (or performs SR) through a transmission/reception bandwidth (BW) that exceeds a 20 MHz transmission/reception bandwidth, it may calculate a new threshold value by adding $10*\log (BW/20 \text{ MHz})$ dB to an OBSS-DL/UL-CCA-CS-threshold value set based on the 20 MHz transmission/reception bandwidth, and may determine the busy or idle state of a transmission channel based on the calculated threshold value.

(2) 2-2 Embodiment

For another example, an SR STA may receive an OBSS-DL-CCA-CS-threshold value and/or an OBSS-UL-CCA-CS-threshold value through the beacon frame of an inter-BSS. In this case, the corresponding threshold values may be configured (or signaled) as in Table 6 to Table 10. In this case, unlike in 2-1 Embodiment (the corresponding threshold values are received through the beacon frame of an intra-BSS), the subject that transmits the corresponding threshold values is an OBSS AP and an SR STA has to receive the beacon frame of an OBSS AP in order to obtain a corresponding OBSS-DL-CCA-CS-threshold value and OBSS-UL-CCA-CS-threshold value.

That is, an AP instructs the AP and STAs of an OBSS in the peripheries of the AP to apply a specific CS-threshold value (or level) when taking into consideration its own BSS (by taking into consideration its own BSS). Unlike in 2-1 Embodiment, this method may correspond to an indirect SR method. In this case, if the AP determines/calculates an OBSS-DL-CCA-CS-threshold value and an OBSS-UL-CCA-CS-threshold value by taking into consideration a BSS to which the AP belongs, it may determine/calculate the OBSS-DL-CCA-CS-threshold value and the OBSS-UL-CCA-CS-threshold value by taking into consideration/using various parameters, such as link quality and the number of STAs within a corresponding BSS and/or its own Tx power.

3. Dynamic Method (1) 3-1 Embodiment

This embodiment proposes that an SR STA first operates SR according to the semi-static method, but receives an OBSS-DL-CCA-CS-threshold value and an OBSS-UL-CCA-CS-threshold value through the HE-SIG A field or the HE-SIG B field other than a beacon frame. Accordingly, the SR STA may receive the OBSS-DL-CCA-CS-threshold value and the OBSS-UL-CCA-CS-threshold value through the HE-SIG A field or the HE-SIG B field, and may perform SR based on the received threshold values.

(2) 3-2 Embodiment

Another embodiment proposes that if the UL/DL frame indicator (or UL/DL indication field) is included prior to the HE-SIG A field, only a single OBSS-CCA-CS-threshold value is included in the HE-SIG A field or the HE-SIG B field and transmitted. That is, in the case of the present embodiment, both the OBSS-DL-CCA-CS-threshold value and the OBSS-UL-CCA-CS-threshold value are not included in a single PPDU as in 3-1 Embodiment, but only a single OBSS-CCA-CS-threshold value is included. Accordingly, in accordance with the present embodiment, only a single OBSS-CCA-CS-threshold value may be included in the HE-SIG A/B field and signaled.

If the UL/DL frame indicator of the HE-SIG A field indicates that an inter-BSS frame is an UL frame, an SR STA that has received such an OBSS-CCA-CS-threshold value may recognize that the corresponding OBSS-CCA-CS-threshold value is an OBSS-"UL"-CCA-CS-threshold value. In contrast, if the UL/DL frame indicator of the HE-SIG A field indicates that the inter-BSS frame is a DL frame, the SR STA that has received the OBSS-CCA-CS-threshold value may recognize the corresponding OBSS-CCA-CS-threshold value is an OBSS-"DL"-CCA-CS-threshold value.

(3) 3-3 Embodiment

Another example proposes that an AP/STA determines an OBSS-CCA-CS-threshold reference value, that is, a basis, through the aforementioned static/semi-static method and transmits a relative difference (or differential information) between the determined OBSS-CCA-CS-threshold reference value and the determined OBSS-CCA-CS-threshold value as a bit size to an SR STA through the HE-SIG A field or the HE-SIG B field by signaling the relative difference.

In this case, if an UL/DL frame indicator indicates an UL frame and the differential information transmitted through the HE-SIG A field or the HE-SIG B field indicates k dB, the SR STA may calculate/obtain an OBSS-UL-CCA-CS-threshold value having a difference of k dB from the OBSS-CCA-CS-threshold reference value (i.e., the OBSS-UL-CCA-CS-threshold value=the OBSS-CCA-CS-threshold reference value ±k dB). Alternatively, if the UL/DL frame indicator indicates a DL frame and the differential information transmitted through the HE-SIG A field or the HE-SIG B field indicates j dB, the SR STA may calculate/obtain an OBSS-DL-CCA-CS-threshold value having a difference of j dB from the OBSS-CCA-CS-threshold reference value (i.e., the OBSS-DL-CCA-CS-threshold value=the OBSS-CCA-CS-threshold reference value ±j dB).

In this case, the OBSS-DL-CCA-CS-threshold reference value and the OBSS-UL-CCA-CS-threshold reference value other than a single OBSS-CCA-CS-threshold reference value may be independently (or individually) may be determined through the aforementioned static/semi-static method. In this case, a relative difference (j dB) between the reference values may be signaled in the HE-SIG A field or HE-SIG B field and transmitted to the SR STA. The SR STA may calculate the OBSS-DL-CCA-CS-threshold and the OBSS-UL-CCA-CS-threshold value having a difference of j dB with respect to each of the reference values.

An SR STA may determine the busy or idle state of a channel using an OBSS-CCA-CS-threshold value or OBSS-DL/UL-CCA-CS-threshold value newly calculated/obtained according to the aforementioned embodiment, and may perform SR.

An AP/STA may have different transmission (Tx) power depending on its device type. In the case of a device type having small Tx power, the AP/STA of the corresponding type may have small interference influence on the receiver of an OBSS although it operates as an SR STA. Accordingly, there is proposed a method for operating, by an SR STA, SR more efficiently using Tx power if the Tx power of an OBSS AP/STA is included in the HE-SIG A field and transmitted.

If a power value (i.e., TX power) P1 of a signal to be transmitted by an SR STA is smaller than a TX power value P2 indicated by the HE-SIG A field of a received inter-BSS frame, the SR STA may set/change an OBSS-CCA-CS-threshold value into a value greater than an existing value. In this case, the SR STA may increase the OBSS-CCA-CS-threshold value by a difference between the Tx power value P1 of the signal to be transmitted by the SR STA and the Tx power value P2 indicated by the HE-SIG A field.

For example, if 20 dBm is indicated as the Tx power value P2 of an OBSS AP/STA in the HE-SIG A field of an inter-BSS frame received by an SR STA and the Tx power value P1 of the SR STA is 17 dBm (20 dBm>17 dBm), the SR STA may calculate/obtain a new OBSS-CCA-CS-threshold value by adding 3 dBm (=20 dBm-17 dBm), that is, a TX power difference value (P2−P1), to an existing OBSS-CCA-CS-threshold value. In this case, the existing OBSS-CCA-CS-threshold value may be obtained through the static, semi-static and/or dynamic method. If an OBSS-DL-CCA-CS-threshold value and an OBSS-UL-CCA-CS-threshold value are separated and independently/individually set (or indicated), an SR STA may calculate/obtain a new OBSS-DL-CCA-CS-threshold value and a new OBSS-UL-CCA-CS-threshold value by adding a TX power difference (i.e., P2−P1) to each of the OBSS-DL-CCA-CS-threshold value and the OBSS-UL-CCA-CS-threshold value.

This may be represented in Equations 1 to 3.

New OBSS-CCA-CS-threshold=OBSS-CCA-CS-threshold+TX power difference [Equation 1]

New OBSS-DL-CCA-CS-threshold=OBSS-DL-CCA-CS-threshold+TX power difference [Equation 2]

New OBSS-UL-CCA-CS-threshold=OBSS-UL-CCA-CS-threshold+TX power difference [Equation 3]

In Equations 1 to 3, the new OBSS-(DL/UL-)CCA-CS-threshold refers to a recalculated/new OBSS-(DL/UL-)CCA-CS-threshold to be practically applied by an SR STA when executing SR. The OBSS-(DL/UL-)CCA-CS-threshold refers to an early/existing OBSS-(DL/UL-)-CCA-CS-threshold value obtained through the static, semi-static and/or dynamic method. The TX power difference refers to a difference between Tx power, indicated by the HE-SIG A field of an inter-BSS frame, and Tx power of an SR STA. Accordingly, the TX power difference may be calculated by the TX power of the inter-BSS frame—the TX power of the SR STA.

If an SR STA performs SR using the TX power parameters as described above, there is an advantage in that an efficient SR operation into which the characteristics of each STA (or device) have been incorporated can be performed.

If an OBSS AP/STA performs OFDMA transmission in a frame, the OBSS-DL-CCA-CS-threshold value and the OBSS-UL-CCA-CS-threshold value in the aforementioned embodiments may be subdivided in a resource unit (RU) unit and indicated/applied. In this case, the resource unit refers to the allocation unit of frequency resources for DL/UL OFDMA transmission. In general, a CCA operation is performed in a 20 MHz unit (or channel spacing or a channel width). Accordingly, in order to apply the proposed method to OFDMA, an OBSS-CCA-CS-threshold value or an OBSS-DL/UL-CCA-CS-threshold value may be indicated/applied in a chunk of a 242 sub-carrier (tone) unit, a 242-tone RU, channel spacing corresponding to 20 MHz and a 20 MHz sub-channel/sub-band or channel bandwidth unit.

In the dynamic method, if the OBSS-DL-CCA-CS-threshold value, the OBSS-DL/UL-CCA-CS-threshold value or the relative difference value between the OBSS-UL-CCA-CS-threshold value and the OBSS-DL-CCA-CS-threshold value is transmitted through the HE-SIG A field or the HE-SIG B field, 1 bit for indicating the following state 1 and/or 2 may be added to the HE-SIG A or B field. Alternatively, 1 bit may not be separately added to the HE-SIG A or B field, and some of bits (2^a states) of the HE-SIG A or B field which are used to indicate an OBSS-DL-CCA-CS-threshold or an OBSS-DL/UL-CCA-CS-threshold or a relative difference therebetween may be designated as a field for indicating the following state 1 and/or 2.

State 1: it means that a frame/PPDU that is now transmitted is a frame/PPDU transmitted through spatial reuse (SR)

State 2: it means that a frame/PPDU that is now transmitted is not a frame/PPDU transmitted through SR.

An AP/STA that has received an inter-BSS frame in which State 1 is indicated by the HE-SIG A or B field may recognize that the received inter-BSS frame is an SR frame received through SR. In this case, the AP/STA may transmit a signal having Tx power smaller than existing Tx power or an MCS level lower than an existing MCS level or may adjust a new OBSS-(DL/UL-)CCA-CS-threshold value down in order to minimize the interference influence of a receiver that receives the SR frame or an interference influence on the receiver. Alternatively, the AP/STA may transmit a signal having Tx power greater than existing Tx power or an MCS level higher than or identical with an existing MCS level or may adjust a new OBSS-(DL/UL-) CCA-CS-threshold value up.

A 1 bit (a bit size may be changed) may be additionally allocated to the HE-SIG A or B field for the following purposes (or in order to indicate the following command/state).

State 1: SR disallowed

State 2: SR allowed

That is, an SR indicator (or indication bit) indicating whether the SR of an SR STA is disallowed or allowed may be included in the HE-SIG A or B field. The SR STA may perform SR based on the SR indicator (or indication bit).

Alternatively, the SR disallowed/allowed information may be indicated using a specific bit (e.g., 1 bit) of the HE-SIG A field as described above, but may be indicated through an SR parameter field transmitted through the HE-SIG A field. In this case, the SR parameter field indicates a field including various pieces of SR indication information that are required for surrounding OBSS AP/STAs to perform SR.

For example, it may be assumed that the bit size of the SR parameter field transmitted through the HE-SIG A field is 4 bits. In this case, if the SR parameter field is set as a specific value (e.g., '0000'), it may indicate SR prohibition for surrounding OBSS AP/STAs. If the SR parameter field is set as the remaining values (e.g., 0001~1111) other than the specific value, it may indicate SR permission for surrounding OBSS AP/STAs and additional SR indication information that is required for the surrounding OBSS AP/STAs to perform allowed SR.

As a result, the SR parameter field may also be indicated or represented as an SR indicator because the SR parameter field also indicates SR prohibition or permission.

An SR STA that has received an inter-BSS frame in which State 1 (SR disallowed) has been indicated is prohibited from performing SR on surrounding OBSS AP/STA during the interval in which a frame now transmitted is transmitted or for TXOP. Furthermore, an SR STA that has received an inter-BSS frame in which State 2 (SR allowed) has been indicated is permitted to perform SR on surrounding OBSS AP/STA during the interval in which a frame now transmitted is transmitted or for TXOP. Accordingly, if an SR STA receives an inter-BSS frame in which State 2 has been indicated, it performs SR if a channel is determined to be valid as a result of the execution of CCA based on a threshold value determined according to the aforementioned embodiment.

In this case, State 1 may be used to protect a control frame or management frame having high importance, such as a beacon frame and a trigger frame for indicating ACK/Block ACK or UL OFDMA transmission. Accordingly, an SR STA that has received an inter-BSS frame in which State 1 has been indicated is prohibited from performing SR as described above, or may perform CCA by applying the original CCA-CS-threshold value or a minimum receive sensitivity level (or minimum CCA sensitivity level) applied to legacy systems without any change other than the OBSS-CCA-CS-threshold value obtained according to the aforementioned embodiments.

Figure 9:
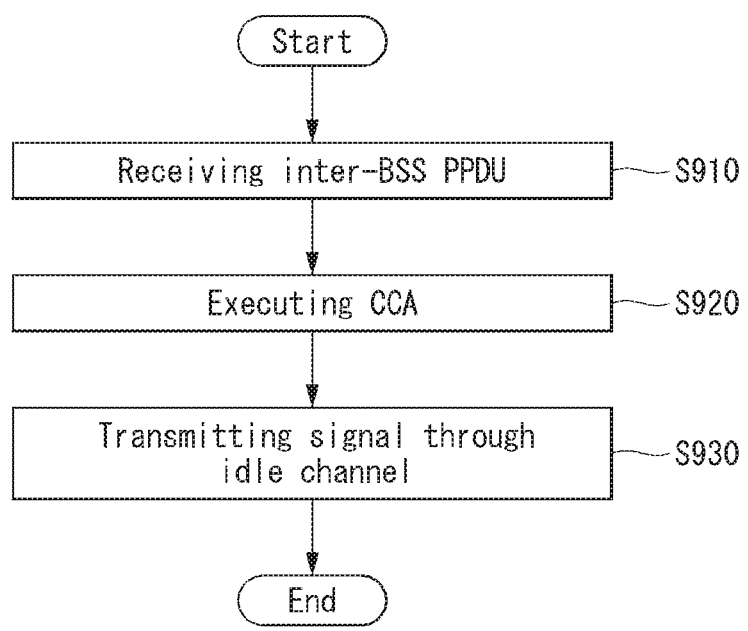
FIG. 9 is a flowchart illustrating an operating method of a first STA according to an embodiment of the present invention.

FIG. 9 is a flowchart illustrating an operating method of a first STA according to an embodiment of the present invention. In this flowchart, the first STA refers to an SR STA. In relation to this flowchart, the aforementioned embodiments may be applied in the same manner. Accordingly, a redundant description is omitted hereunder.

Referring to FIG. 9, first, the first STA may receive an inter-BSS PPDU (S910). In this case, the inter-BSS PPDU may refer to a PPDU that is transmitted by an AP or STA associated with a second BSS different from a first BSS with which the first STA has been associated. In order to determine whether the received frame is an inter-BSS frame or an intra-BSS frame, the first STA may use the MAC address of a BSS color (an identifier used to determine a BSS) and/or MAC header included in the HE-SIG A field (or the HE-SIG A field included in a PPDU that carries the received frame.

The inter-BSS PPDU may include a PHY preamble and an inter-BSS frame. Furthermore, the HE-SIG A field of the PHY preamble may include an SR indicator that indicates whether SR is allowed. If the SR indicator indicates SR permission, the first STA may proceed to step S920.

If the SR indicator indicates SR permission, the first STA may perform CCA on the transmission/reception channel of the inter-BSS frame based on a CCA level, that is, a criterion by which the busy or idle of a channel is determined (S920). In this case, the CCA level is the term that collectively refers to the OBSS-CCA-CS-threshold value (or CCA threshold value), the OBSS-CCA-CS-threshold value, and the OBSS-CCA-CS-threshold value described in the aforementioned embodiments. The CCA level may be divided into first and second CCA levels. The first CCA level denotes the OBSS-UL-CCA-CS-threshold value, and the second CCA level denotes the OBSS-DL-CCA-CS-threshold value.

At step S920, the first STA may determine the busy or idle state of a channel by applying/using a CCA level determined using the static/semi-static/dynamic methods when performing CCA. This has been described above. More specifically, if the first STA performs SR using the semi-static/dynamic method, it may receive information about the first and the second CCA levels from the outside and may determine the first and the second CCA levels based on the received information. In this case, the information about the first and the second CCA levels indicate the first and the second CCA levels or information about a level difference between the first or the second CCA level and the first and the second CCA levels.

Furthermore, at step S920, a channel on which CCA is to be performed may correspond to a channel in which the inter-BSS frame is transmitted or a channel in which a frame to be transmitted by the first STA is transmitted.

If, as a result of the execution of CCA, the channel is determined to be idle, the first STA may transmit a signal/data/frame through the idle channel (S930). That is, the first STA may perform SR through the channel determined to be idle as a result of the execution of CCA.

Figure 10:
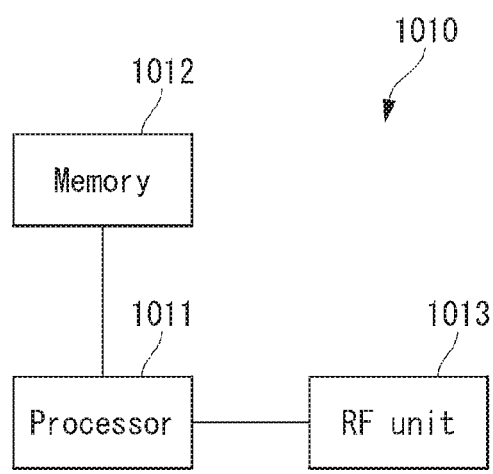
FIG. 10 is a block diagram of each STA device according to an embodiment of the present invention.

FIG. 10 is a block diagram of each STA device according to an embodiment of the present invention.

Referring to FIG. 10, the STA device (or STA) 1010 may include memory 1012, a processor 1011, and a radio frequency (RF) unit 1013. Furthermore, as described above, the STA device 1010 is an HE STA device and may be an AP STA or a non-AP STA.

The RF unit 1013 is connected to the processor 1011 and may transmit/receive radio signals. The RF unit 1013 may up-convert data, received from the processor 1011, into a transmission/reception band, and may transmit a signal.

The processor 1011 is connected to the RF unit 1013 and may implement the physical layer and/or the MAC layer according to the IEEE 802.11 system. The processor 1011 may be configured to perform operations according to the various embodiments of the present invention based on the drawings and description. Furthermore, a module for implementing the operations of the STA 1010 according to the various embodiments of the present invention may be stored in the memory 1012 and may be executed by the processor 1011.

The memory 1012 is connected to the processor 1011 and stores various pieces of information for driving the processor 1011. The memory 1012 may be included in the processor 1011 or may be installed outside the processor 1011, and may be connected to the processor 1011 by the known means.

Furthermore, the STA device 1010 may include a single antenna or multiple antennas.

A detailed configuration of the STA device 1010 of FIG. 10 may be implemented so that the various embodiments of the present invention are independently applied to the configuration or two or more of the various embodiments are applied to the configuration at the same time. More specifically, the processor 1011 of the STA device may be implemented to perform the aforementioned embodiments.

Furthermore, the terms described in the embodiments of the present invention may be substituted with other terms according to circumstances and are not limited to the aforementioned terms. Accordingly, although a different term is used, it may be considered as indicating the same object if it has the same function.

In the aforementioned embodiments, the elements and characteristics of the present invention have been combined in specific forms. Each of the elements or characteristics should be considered to be optional unless otherwise described explicitly. Each of the elements or characteristics may be implemented without being combined with other elements or characteristics. Furthermore, some of the elements and/or the characteristics may be combined to form an embodiment of the present invention. The sequence of the operations described in connection with the embodiments of the present invention may be changed. Some of elements or characteristics in an embodiment may be included in another embodiment or may be substituted with corresponding elements or characteristics in another embodiment. It is evident that in the claims, claims not having an explicit citation relation may be combined to form one or more embodiments or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

The various embodiments have been described in the beat mode for implementing the present Invention.

INDUSTRIAL APPLICABILITY

Although the frame transmission method in a wireless communication system according to the embodiments of the present invention has been described based on an example in which the method is applied to the IEEE 802.11 system, it may also be applied to various wireless communication systems in addition to the IEEE 802.11 system.

What is claimed is:

1. A spatial reuse, SR, method of a first station, STA, associated with a first basic service set, BSS, in a wireless local area network, WLAN, system, the SR method comprising:
   receiving an inter-BSS physical protocol data unit, PPDU, from an AP or a second STA associated with a second BSS different from the first BSS,
   wherein the inter-BSS PPDU comprises a physical, PHY, preamble and an inter-BSS frame,
   wherein a high efficiency signal, HE-SIG, A field of the PHY preamble comprises an SR indicator indicating whether SR is allowed;
   executing a clear channel assessment, CCA, on a channel based on a CCA level which is a criterion by which a busy or idle state of the channel is determined when the SR indicator indicates that SR is allowed,
   wherein, when the CCA level applied in a 20 MHz channel is set to a reference threshold value, the CCA level applied in a greater channel than the 20 MHz channel is calculated by adding a predetermined value to the reference threshold value; and
   transmitting a signal through the channel when the channel is in the idle state as a result of the execution of the CCA,
   wherein, when the PPDU is an UL PPDU, a first CCA level is applied to the CCA level, and
   wherein, when the PPDU is a DL PPDU, a second CCA level smaller than the first CCA level is applied to the CCA level.

2. The SR method of claim 1, wherein the HE-SIG A field further comprises an uplink, UL/downlink, DL, indicator indicating whether the inter-BSS PPDU is a DL PPDU transmitted by the AP or an UL PPDU transmitted by the second STA.

3. The SR method of claim 1, wherein the CCA level is increased as the transmission power is decreased.

4. The SR method of claim 3, wherein the CCA level applied in the greater channel is calculated by adding 3 dB to the reference threshold value whenever the bandwidth of the greater channel is twice larger than the 20 MHz channel.

5. The SR method of claim 4, wherein the CCA level applied in the greater channel is determined according to an equation 1:

$$C1=C2+10*\log(BW/20 \text{ MHz}), \qquad \text{[Equation 1]}$$

wherein C1 is the CCA level applied in the greater channel, C2 is the CCA level applied in the 20 MHz channel and BW is the bandwidth of the greater channel.

6. The SR method of claim 5, wherein receiving the inter-BSS PPDU comprises:
receiving a PPDU; and
determining whether the received PPDU is the inter-BSS PPDU or not by using a BSS color or Medium Access Control, MAC, address in the PPDU.

7. A first station, STA, associated with a first basic service set, BSS, in a wireless local area network, WLAN, system, the first STA comprising:
a radio frequency, RF, unit configured to transmit and receive a radio signal; and
a processor configured to control the RF unit,
wherein the first STA is configured to:
receive an inter-BSS physical protocol data unit, PPDU, from an AP or second STA associated with a second BSS different from the first BSS,
wherein the inter-BSS PPDU comprises a physical, PHY, preamble and an inter-BSS frame,
wherein a high efficiency signal, HE-SIG, A field of the PHY preamble comprises an SR indicator indicating whether SR is allowed;
execute a clear channel assessment, CCA, on a channel based on a CCA level which is a criterion by which a busy or idle state of the channel is determined when the SR indicator indicates that SR is allowed,
wherein, when the CCA level applied in a 20 MHz channel is set to a reference threshold value, the CCA level applied in a greater channel than the 20 MHz channel is calculated by adding a predetermined value to the reference threshold value; and
transmit a signal through the channel when the channel is in the idle state as a result of the execution of the CCA,
wherein, when the PPDU is an UL PPDU, a first CCA level is applied to the CCA level, and
wherein, when the PPDU is a DL PPDU, a second CCA level smaller than the first CCA level is applied to the CCA level.

8. The first STA of claim 7, wherein the CCA level is increased as the transmission power is decreased.

9. The first STA of claim 8, wherein the CCA level applied in the greater channel is calculated by adding 3 dB to the reference threshold value whenever the bandwidth of the greater channel is twice larger than the 20 MHz channel.

10. The first STA of claim 9, wherein the CCA level C1 applied in the greater channel is determined according to an equation 1:

$$C1 = C2 + 10 * \log(BW/20 \text{ MHz}),$$ [Equation 1]

wherein C1 is the CCA level applied in the greater channel, C2 is the CCA level applied in the 20 MHz channel and BW is the bandwidth of the greater channel.

11. The first STA of claim 10, wherein the first STA is configured to:
receive a PPDU; and
determine whether the received PPDU is the inter-BSS PPDU or not by using a BSS color or (Medium Access Control), MAC, address in the PPDU.

12. The first STA of claim 7, wherein the HE-SIG A field further comprises an/a uplink, UL/downlink, DL, indicator indicating whether the inter-BSS PPDU is a DL PPDU transmitted by the AP or an UL PPDU transmitted by the second STA.

* * * * *